United States Patent
Domanchuk et al.

(10) Patent No.: US 8,893,580 B2
(45) Date of Patent: Nov. 25, 2014

(54) THERMAL SPRAY COATING FOR CONNECTING ROD SMALL END

(71) Applicants: David Domanchuk, Grand Haven, MI (US); Michael T. Lapp, Bloomfield, MI (US); Wolfgang Rein, Milford, MI (US); Christopher Hall, Brighton, MI (US); Thomas Stong, Kent City, MI (US); Thomas J. Smith, Muskegon, MI (US)

(72) Inventors: David Domanchuk, Grand Haven, MI (US); Michael T. Lapp, Bloomfield, MI (US); Wolfgang Rein, Milford, MI (US); Christopher Hall, Brighton, MI (US); Thomas Stong, Kent City, MI (US); Thomas J. Smith, Muskegon, MI (US)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/653,099

(22) Filed: Oct. 16, 2012

(65) Prior Publication Data

US 2013/0091980 A1  Apr. 18, 2013

Related U.S. Application Data

(60) Provisional application No. 61/547,895, filed on Oct. 17, 2011.

(51) Int. Cl.
  *F16C 7/00* (2006.01)
  *F16C 9/04* (2006.01)
  *F16C 33/14* (2006.01)
  *F16C 33/12* (2006.01)

(52) U.S. Cl.
  CPC ............... *F16C 9/04* (2013.01); *F16C 2240/60* (2013.01); *F16C 2223/00* (2013.01); *F16C 33/14* (2013.01); *F16C 2240/70* (2013.01); *F16C 33/124* (2013.01)
  USPC ........................................................ 74/579 E

(58) Field of Classification Search
  USPC ............................................... 74/579 E, 579 R
  See application file for complete search history.

(56) References Cited

U.S. PATENT DOCUMENTS

| | | | | |
|---|---|---|---|---|
| 4,873,951 | A | * | 10/1989 | Garthwaite ............... 123/196 W |
| 5,551,782 | A | * | 9/1996 | Arnhold et al. ................ 384/294 |
| 6,027,784 | A | * | 2/2000 | Taguchi ........................ 428/131 |
| 6,513,238 | B1 | * | 2/2003 | Schlegel .................... 29/888.09 |
| 2009/0078080 | A1 | * | 3/2009 | Kemnitz et al. ............. 74/579 E |

FOREIGN PATENT DOCUMENTS

| | | |
|---|---|---|
| DE | 102004006635 A1 | 8/2005 |
| DE | 102004024576 A1 | 12/2005 |
| DE | 102004043648 A1 | 3/2006 |
| DE | 102008028958 A1 | 1/2009 |

OTHER PUBLICATIONS

International Search Report, PCT/US2012/060574, dated Jan. 23, 2013.

* cited by examiner

*Primary Examiner* — Vicky Johnson
(74) *Attorney, Agent, or Firm* — Rader, Fishman & Grauer PLLC

(57) ABSTRACT

A connecting rod having a small end and a large end, the small end including a pin bore defined by a pin bore surface. A thermal spray coating applied to at least a portion of the pin bore surface and a method of applying the thermal spray coating to the pin bore surface using a thermal spray technique.

19 Claims, 7 Drawing Sheets

THERMAL SPRAY COATING FOR CONNECTING ROD SMALL END

CROSS-REFERENCE TO RELATED APPLICATION

This application claims priority to U.S. Provisional Application Ser. No. 61/547,895, filed on Oct. 17, 2011, the contents of which are hereby expressly incorporated by reference in their entirety.

FIELD

The present disclosure generally relates to a thermal spray coating for a connecting rod small end.

BACKGROUND

Traditional internal combustion engines rely on a connecting rod for transmitting combustion power generated during the combustion cycle of an internal combustion engine from a piston to the crankshaft of the engine. Connecting rods are typically defined by a first end and a second end. The first end and the second end each typically include an aperture disposed therein. Typically, the aperture disposed in the first end of the connecting rod is smaller than the aperture disposed in the second end of the connecting rod. Thus, the aperture in the first end of the connecting rod is configured to connect to the piston by way of a piston pin and the aperture in the second end of the connecting rod is configured to connect to the crankshaft by way of a crankshaft pin.

Commonly, a metallic bushing is disposed within the small end of the connecting rod, e.g., in order to decrease wear of pin bore surfaces. However, such bushings are susceptible to fatigue and/or failure themselves. Bushings also increase the mass of the piston and connecting rod assembly and make the assembly process more complex.

Accordingly, there is a need for a connecting rod having a bushingless small end capable of withstanding the high pressure environment of an internal combustion engine in the absence of such bushings. Moreover, there is a need for a connecting rod that addresses these needs while providing cost-effective performance and remaining practical for production in a mass manufacturing environment.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
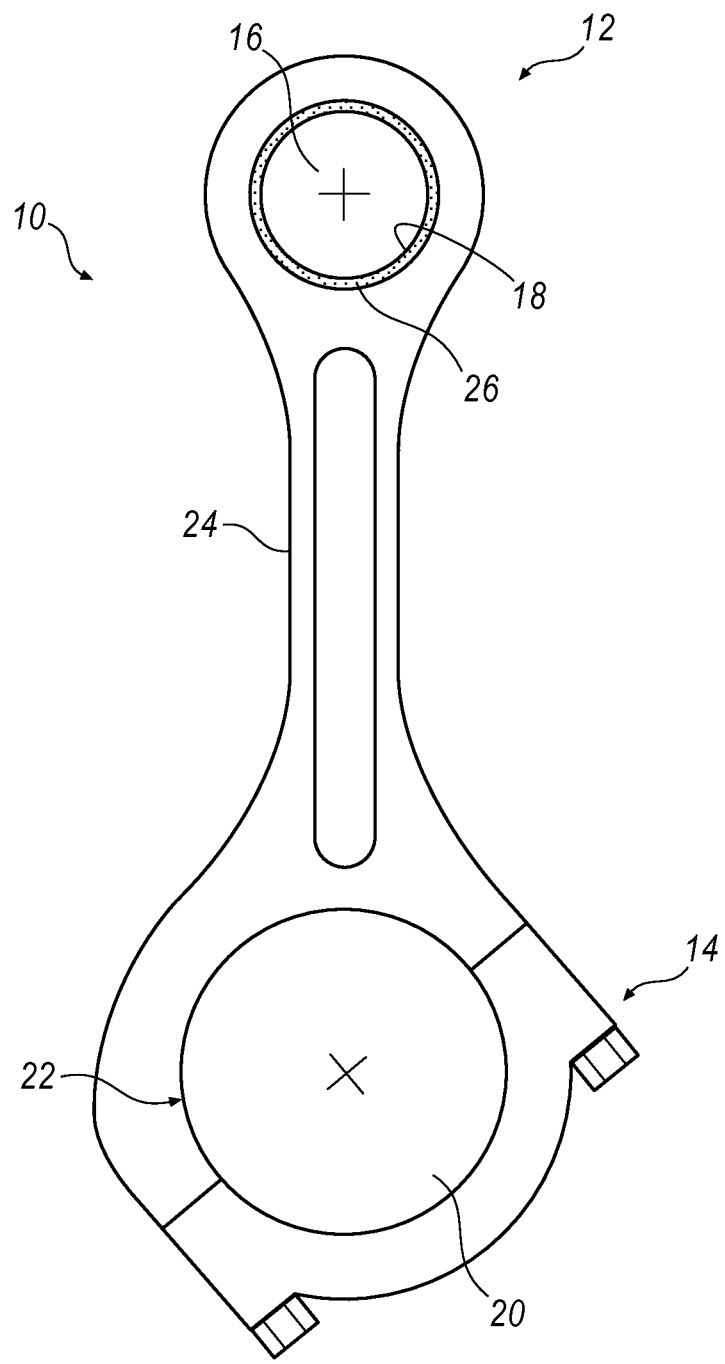
FIG. 1 illustrates a connecting rod, according to an exemplary illustration.
Figure 2:
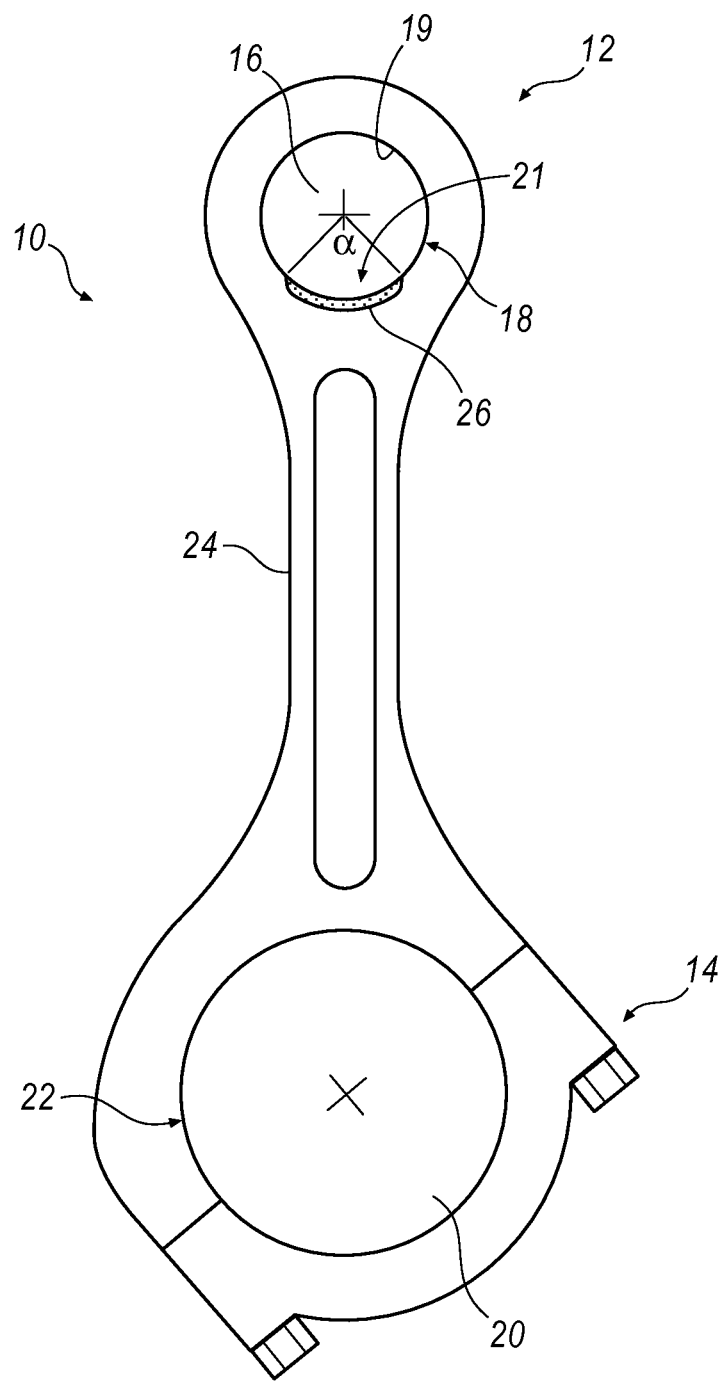
FIG. 2 illustrates a connecting rod, according to another exemplary illustration.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

FIG. 1 illustrates an exemplary connecting rod 10. The connecting rod 10 includes a piston pin end or small end 12 and a crankshaft end or large end 14. The small end 12 includes a piston pin aperture or bore 16 defined by a pin bore surface 18. The large end 14 includes a crankshaft pin bore 20 defined by a crankshaft bore surface 22. The crankshaft pin bore 20 may be generally larger in diameter than the piston pin bore 16. The connecting rod 10 is further defined by a beam 24 extending between the small end 12 and the large end 14. The beam 24 may include a generally I-shaped cross-section typical of connecting rods or any other suitable cross-section, including other quadrangular cross-sections.

In a typical internal combustion engine, the connecting rod 10 transmits combustion power from the piston to the crankshaft of the engine, thereby converting the linear motion of the piston to rotational motion at the crankshaft. Combustion power is generated from the intermittent ignition of a combustible fuel such as gasoline that is injected into the combustion chamber, which creates extreme pressures that are applied to the piston and the connecting rod. In order to transmit combustion power, the connecting rod 10 may be coupled to a piston by way of a piston pin (not shown). Thus, the interface between the piston pin bore and the piston pin experiences continuous radial loads during operation. Moreover, as described below radial loads applied by the piston pin to the piston pin bore 16 and/or piston pin bore surface 18 may be concentrated in a high-load zone or area of the pin bore surface 18.

FIG. 1 illustrates the small end 12 of the connecting rod 10 having a thermal spray coating 26 applied to the pin bore surface 18 of the pin bore 16. Application of a thermal spray coating 26 to the pin bore surface 18 may generally increase a load carrying capability and wear resistance of the small end of the connecting rod 10, e.g., as compared to an uncoated bushingless pin bore surface. That is, the thermal spray coating 26 may be comprised of materials that offer material properties capable of better resisting the wear that may occurs as a result of the continuous radial loads applied to the piston pin bore during operation. Moreover, the thermal spray coating 26 may generally reduce overall mass of the connecting rod and complexity of forming a connecting rod and piston assembly as compared to connecting rods employing bushings, by eliminating the need for a bushing entirely. In addition, the thermal spray coating 26 improves the robustness of the connecting rod by eliminating the potential for failure between the bushing and the connecting rod 10.

As illustrated in FIG. 1, in one exemplary illustration the thermal spray coating 26 may be applied to the entire inner circumference of the pin bore surface 18 of the pin bore 16. However, in some exemplary approaches the thermal spray coating may be applied to specific areas of the pin bore surface 18. For example, as will be described further below, FIGS. 2, 3A, 3B, 3C, 3D, and 4 illustrate exemplary connecting rods 10 having a thermal spray coating 26 applied only to a portion of the pin bore surface 18 of the pin bore 16, e.g., a high load area of the pin bore surface 18. The thermal spray coating 26 may also be applied to other areas of the pin bore 16 that are susceptible to wear and fatigue.

The thermal spray coating 26 may be applied directly to the pin bore surface 18. In some instances the pin bore surface 18 may be roughened prior to the application of the thermal spray coating 26. A bonding layer may also need to be applied to the pin bore surface 18 prior to the application of the thermal spray coating.

The thermal spray coating 26 may be comprised of any suitable type of alloy, multiphase alloys, and/or combinations thereof. Examples of such materials include, but are not limited to, copper alloys, iron alloys, nickel alloys, cobalt alloys, molybdenum alloys, tin alloys, and aluminum alloys. The thermal spray coating 26 may be applied such that the coating has a suitable thickness based on the engine type and/or the piston type. In one exemplary approach, the thermal spray coating 26 may have a thickness in the range of about 5 to 100 microns.

The thermal spray coating 26 may be applied using the following thermal spray application methods: HVOF, plasma, arc spray, and/or flame spray. The material(s) selected to form the desired thermal spray coating 26 may be introduced into the spray device such that the material(s) melt or partially melt. Thus, when the material(s) contacts pin bore surface 18, a thermal spray coating 26 is formed. Due to thermal spray application the use of high performance materials is possible.

The use of these spray techniques to apply the thermal spray coating 26 may require the use of a heat treatment to normalize and strengthen the thermal spray coating 26 such that any residual stresses within the thermal spray coating 26 are removed. The heat treatment may also prevent the thermal spray coating 26 from pulling away from the pin bore surface 18 after the thermal spray coating 26 has cooled. After applying the thermal spray coating 26, machining may be performed to form a finished bearing surface.

During operation, the load applied to the piston can cause the piston pin to bend within the pin bore 16. Typically, the pin bore 16 is machined to adapt to the bending of the piston pin. In this way, the loading of the pin bore 16 is evenly distributed. However, the use of thermal spray coating 26 may alleviate the need for such machining. Indeed, based on the material selected for the thermal spray coating 26, the thermal spray coating 26 may contour to the profile of the piston pin during engine operation. That is, the movement of piston pin within the pin bore 16 can cause portions of the thermal spray coating 26 to contour itself to the piston pin.

The thermal spray coating 26 may also improve the hydrodynamic lubrication of the pin bore 16. In some exemplary approaches the thermal spray coating 26 may be formed from a material capable of allowing an oil film to be maintained between the pin bore surface 18 and the piston pin due to the inherent porosity of the thermal spray coating 26. Maintaining an oil film, especially in high pressure zones, is advantageous because it reduces wear on the pin bore 16 over time. However, the oil film also reduces scuffing, a primary cause of pin seizure. In another exemplary approach, solid lubricants, such as bismuth, tin, MoS2, WS2, may be added to the thermal spray coating 26. Inclusion of solid lubricants reduces friction. In some instances, the thermal spray coating 26 may also be used to eliminate finish machining.

As noted above, a thermal spray coating 26 may in some exemplary approaches be applied only to a portion of the pin bore surface 18 of the pin bore 16, e.g., a high load area of the pin bore surface 18. In other words, as best seen in FIGS. 2, 3A, 3B, and 3C, the piston bore surface 18 may generally include a first portion 21, to which a thermally sprayed coating is applied, and a second portion 19 left uncoated by the thermally sprayed coating. The first portion 21 and second portion 19 of the pin bore surface 18 may generally cooperate to form an entire circumference about the piston pin bore 16.

In one example, a highly loaded area is defined as a region, i.e., first portion 21, where contact pressure from a piston pin, e.g., as a result of combustion loads, exceeds a pre-determined limit. In one exemplary illustration, a predetermined limit is a pressure at which a material associated with the piston pin bore 16, e.g., steel, is known to scuff, wear or seize with the wrist pin. Merely as an illustration, in one example a highly loaded area of a piston pin bore surface 18 may be an area experiencing at least 165 MPa during operation. This area may be defined as an angular portion of the bore surface 18, e.g., as indicated by an angle $\alpha$ in FIG. 2. Accordingly, the thermal spray coating 26 is applied to pin bore 18, including at least the angular portion defined by the angle $\alpha$ subject to loads above the predetermined limit. A highly loaded area or angular portion of the pin bore surface 18 may generally be determined, in part, from factors influencing loads applied by the piston pin to the pin bore surface 18 during engine operation, including, but not limited to, combustion loading, wrist pin bending, and the geometry of the piston pin bore surface 18. In one exemplary illustration, angle $\alpha$ may be less than 180 degrees. In another example, the angle $\alpha$ is between approximately 45 degrees and approximately 135 degrees. In yet another example, the angle $\alpha$ is approximately 90 degrees.

Figure 3A:
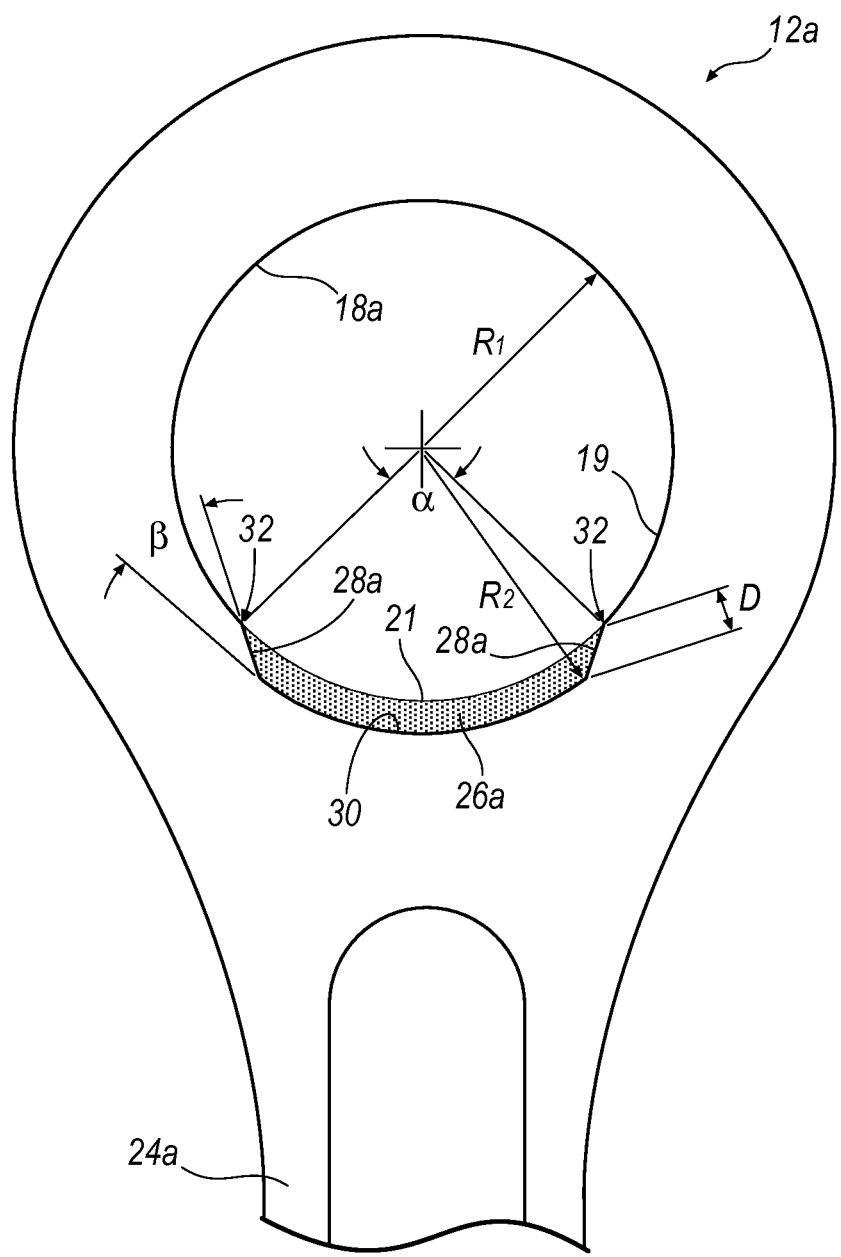
FIG. 3A illustrates an enlarged view of a connecting rod, according to an exemplary illustration.
Figure 3B:
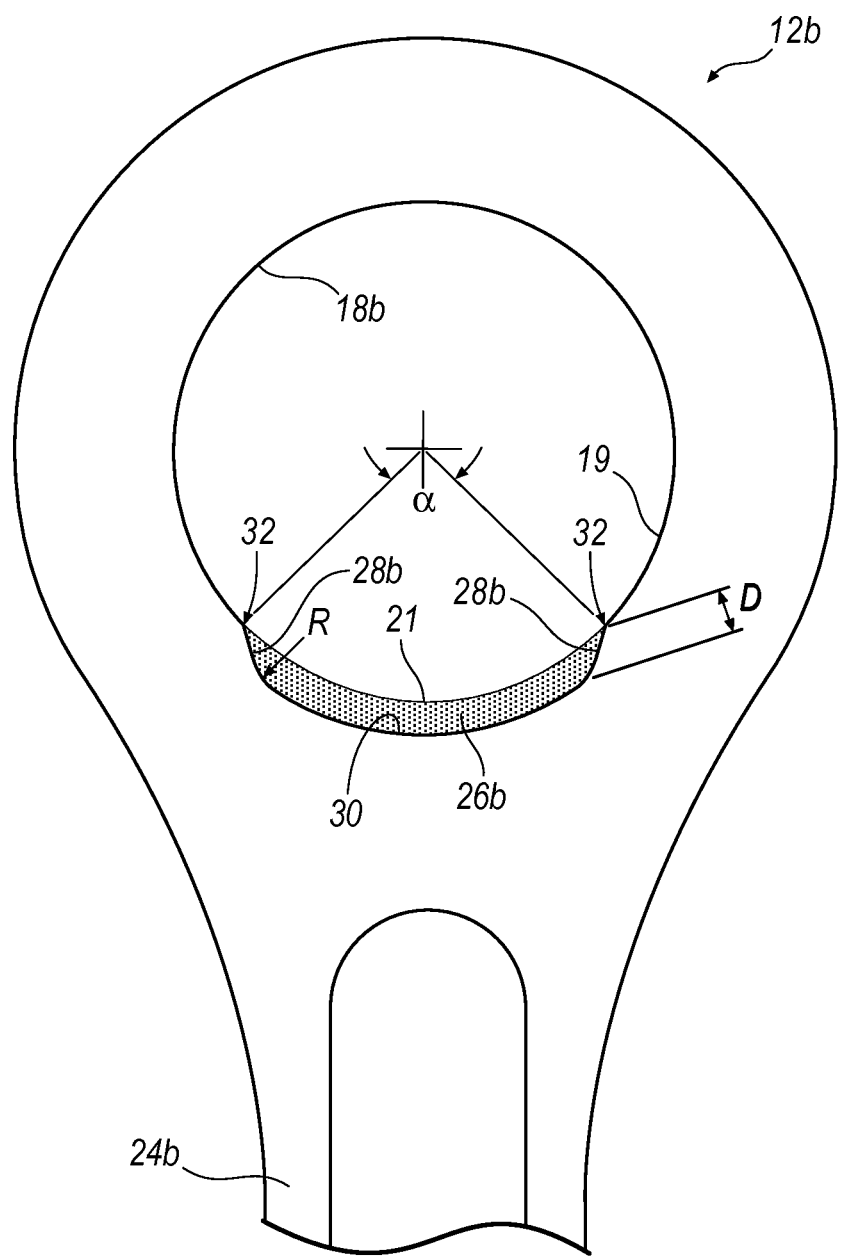
FIG. 3B illustrates an enlarged view of a connecting rod, according to an exemplary illustration.
Figure 3C:
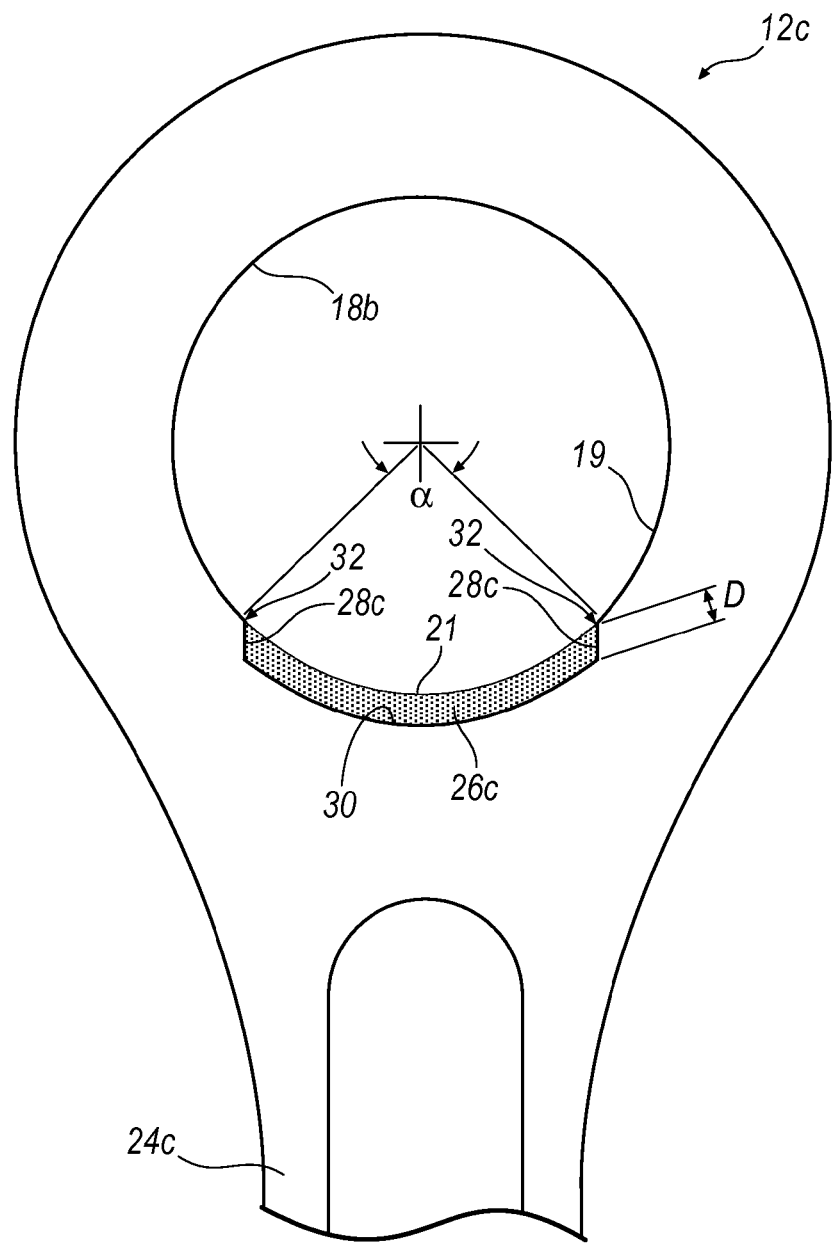
FIG. 3C illustrates an enlarged view of a connecting rod, according to an exemplary illustration.

Turning now to FIGS. 3A, 3B, and 3C, further examples of small ends 12a, 12b, and 12c (collectively, 12) of exemplary connecting rods 10 having thermally sprayed coatings applied to only a first portion 21 of a piston pin bore surface 18a, 18b, and 18c (collectively, 18) are discussed in further detail. As noted above, a second portion 19 of the piston pin bore surface 18 is generally uncoated by the thermally sprayed coating 26 and thereby exposed.

Applying a thermally sprayed coating 26 to only a portion of the pin bore surface, e.g., first portion 21, may generally allow for reduced costs associated with manufacturing of connecting rod 10, at least by reducing an amount of coating material used during the process. Moreover, a thermally sprayed coating 26 may generally not be needed in areas of the pin bore surface 18, e.g., second portion 19, which generally do not exceed certain predetermined load thresholds during operation.

While minimizing material usage associated with a thermally sprayed coating 26 may reduce costs of producing connecting rods 10, discontinuities in the pin bore surface 18, e.g., at an interface or border between a coated portion 21 of the surface 18 and uncoated portion 19, may cause degradation of the thermally sprayed coating 26. For example, chips or cracks in the thermally sprayed coating 26 may propagate if an edge of the thermally sprayed coating 26 is not substantially smooth, resulting in unevenness or discontinuities across an interface or border between the coated portion 21 and uncoated portion 19 of the pin bore surface 18. Accordingly, it may be advantageous to ensure a substantially smooth pin bore surface 18 across an interface or border between the coated portion 21 and uncoated portion 19 of the pin bore surface 18, as will be described in further detail below.

The first portion 21 of the piston pin bore surface 18 may be coated by the thermally sprayed coating 26, which defines a thickness or depth D with respect to the uncoated portion 19. Accordingly, the first portion 21 of the piston pin bore surface 18 may be defined by a top surface of the thermally sprayed coating 26, which is applied to a recessed surface 30 of the piston pin bore surface 18. The recessed surface 30 associated with the first portion 21 of the piston pin bore surface 18 may define a radius $R_2$ with respect to a bore center of the piston pin bore surface 18, for example as best seen in FIG. 3A. In one exemplary illustration, the radius $R_2$ of the first portion 21 is larger than a radius $R_1$ defined by the second portion 19 of the pin bore surface 18 with respect to the same bore center.

A recess distance or depth D associated with the recessed surface 30 may correspond to or be substantially equal to a coating thickness of the thermally sprayed coating 26. Moreover, where a thermally sprayed coating is applied only to a portion of a piston pin bore surface 18, as in the examples shown in FIGS. 2, 3A, 3B, and 3C, edges 32 of the thermally sprayed coating 26 may generally be flush with the adjacent uncoated portion(s) 19 of the piston pin bore surface 18. Accordingly, the entire pin bore surface 18 may be substantially smooth and continuous, including the coated portion 21 and uncoated portion 19. Moreover, as noted above an interface between the coated portion 21 and uncoated portion 19, e.g., along the edges 32 of the thermally sprayed coating 26, may be substantially smooth or flush such that discontinuities are minimized or eliminated.

As shown in FIG. 3A, the recessed surface 30 is spaced from the uncoated portion 19 of the pin bore surface 18a by recess transitions 28a. More specifically, recess transitions 28a are positioned between the recessed surface 30 and the uncoated portion 19 of the pin bore surface 18 at either end of the recess surface 30. The recess transitions 28a each define an oblique angle extending from the recess surface 30 to the adjacent uncoated portion 19 of the pin bore surface 18a. In one exemplary illustration, the recess transitions 28a define an angle β, measured with respect to a tangent extending from the recessed surface 30. The angle β may be any angle that is convenient. In one exemplary illustration, the angle β is such that the recess transitions 28a generally allows for a gradual thinning of the thermally sprayed coating 26a from a maximum thickness, i.e., substantially equal to the recess depth D along the recessed surface 30, to zero at the edges 32 of the thermally sprayed coating 26a. In one exemplary illustration, the angle β is approximately 30 degrees. In another exemplary illustration, the angle β is approximately 45 degrees. A gradual thinning of the thermally sprayed coating 26a to zero, i.e., at the edges 32, may generally promote a generally smooth interface at the edges 32 of the thermally sprayed coating 26a. The gradual slope of the recess transitions 28a to the recessed surface 30 at the maximum depth D may allow use of forming processes, e.g., electrical discharge machining processes such as a wire electrical discharge machining (EDM) process.

Turning now to FIG. 3B, another exemplary small end 12b of a connecting rod 10 is illustrated. The small end 12b of the rod is generally similar to that described above in FIG. 3A. However, instead of the angled recess transitions 28a that are angled with respect to the recess surface 30, small end 12b includes recess transitions 28b that include curved fillets extending from the recess surface 30 to the uncoated portion 19 of the piston pin bore surface 18b, i.e., at the edges 32 of the thermally sprayed coating 26b. As with the angled surface recess transitions 28a shown in FIG. 3A, the curved fillet recess transitions 28b generally allow for a gradual thinning of the thermally sprayed coating 26b from a maximum thickness, i.e., substantially equal to the recess depth D along the recessed surface 30, to zero at the edges 32 of the thermally sprayed coating 26b. Moreover, this thinning of the thermally sprayed coating 26b may promote a generally smooth interface at the edges 32 of the thermally sprayed coating 26b.

Turning now to FIG. 3C, another exemplary small end 12c of a connecting rod 10 is illustrated. The small end 12c of the rod is generally similar to that described above in FIG. 3A. However, in the example illustrated in FIG. 3C, the recess transitions 28c generally extend vertically, or substantially so, from the recess surface 30 to the uncoated portion 19 of the piston pin bore surface 18c, i.e., at the edges 32 of the thermally sprayed coating 26c. In another exemplary illustration, the recess transitions 28c may be parallel or substantially so with respect to the beam 24, or an axis of the connecting rod 10 extending between the piston pin bore surface 18c and the large or crankshaft bore 22. The recess transitions 28c generally allow for a gradual thinning of the thermally sprayed coating 26c from a maximum thickness, i.e., substantially equal to the recess depth D along the recessed surface 30, to zero at the edges 32 of the thermally sprayed coating 26c, in a manner generally similar to that described above regarding FIGS. 3A and 3B. Moreover, recess transitions 28c may generally allow for use of machining operations that are practical for mass manufacturing environments, e.g., broaching, to form the recessed surface 30 and recess transitions 28c, as the recess transitions 28c extend generally parallel to one another, thereby permitting use of a broaching tool to form the recessed surface 30 and the recess transitions 28c.

Figure 4:
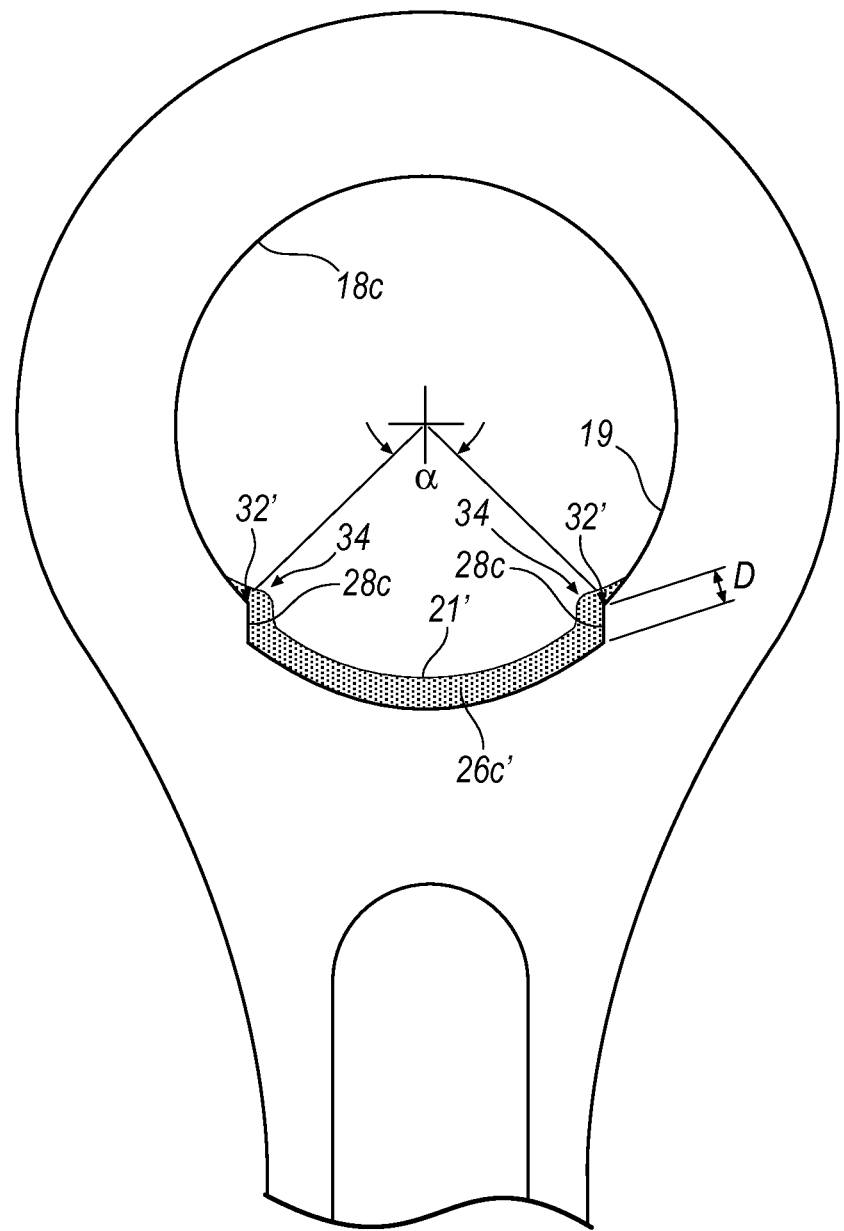
FIG. 4 illustrates an enlarged view of a connecting rod after application of a spray coating and prior to finishing of the piston pin bore, according to an exemplary illustration.

The recessed surface 30 and recess transitions 28a, 28b, 28c may be machined in any manner convenient, e.g., a wire EDM process, a milling process, or a broaching process, after an initial "rough" machining of the piston pin bore surface 18. A thermally sprayed coating 26c may be subsequently applied to the recess surface 30, after which the piston pin bore surface 18 may be finish machined to define the final configuration of the first (coated) portion 21 of the piston pin bore and the second (uncoated) portion 19. More specifically, as best seen in FIG. 4, which illustrates the piston pin bore surface 18c having a recess surface 30 and vertically extending recess transitions 28c, a thermally sprayed coating 26c' may initially be applied such that the thermally sprayed coating 26c' generally overflows onto the eventual uncoated portion 19 of the pin bore surface 18c. In other words, the thermally sprayed coating 26c' may define a thickness greater than the eventual maximum depth D of the thermally sprayed coating 26c shown in FIG. 3C. Accordingly, after application of the thermally sprayed coating 26c', a finish machining operation is applied to the entire piston pin bore surface 18c, thereby machining away any excess thermally sprayed coating 26c' and also generally simultaneously performing final finish machining of the uncoated portion 19 of the piston pin bore surface 18. The generally simultaneous machining of the thermally sprayed coating 26c' and the adjacent uncoated portion 19 of the piston pin bore surface 18c may generally prevent discontinuities between the uncoated portion 19 and the coated portion 21, by generally simultaneously removing material from the adjacent surfaces 19, 21.

Figure 5:
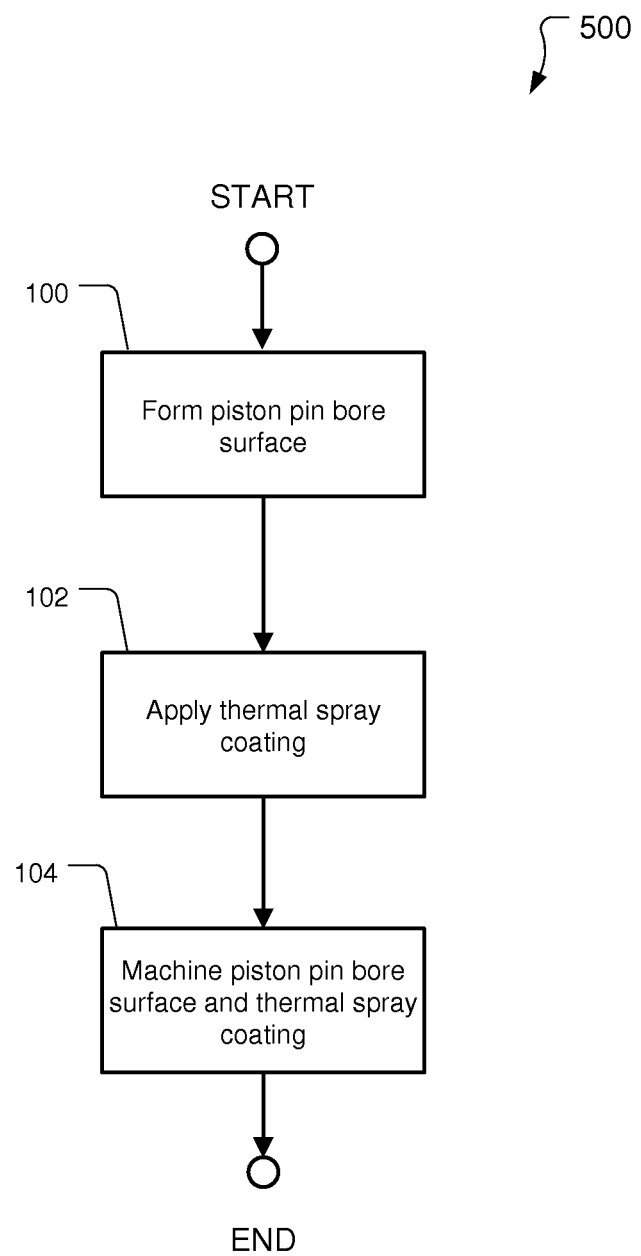
FIG. 5 illustrates an exemplary method of applying a spray coating to a small end of a connecting rod.

With reference to FIG. 5, an exemplary process 500 of applying a thermal spray coating 26 to a small end 12 of a connecting rod 10 is illustrated. At block 100, the pin bore 16 may be machined using any suitable means. In one example, a connecting rod may be provided having a piston pin end, a crankshaft pin end, and a beam extending therebetween. Subsequently, a piston pin bore 16 may be formed in the piston pin end, including forming a piston pin bore surface 18. As noted above, the piston pin bore surface 18 may have a first portion 21 and a second portion 19 forming an entire circumference of the piston pin bore surface 18. Moreover, the first portion 21 of the pin bore surface 18 may be supported by a recessed surface 30 that is recessed with respect to the second portion 19 by a recess distance, e.g., recess depth D as illustrated above. The recess surface 30 may be formed in a subsequent machining operation, e.g., broaching operation. A crankshaft pin bore may be formed in the crankshaft pin end, e.g., by a machining process, to form a crankshaft pin bore 20 defined by a crankshaft surface 22, as described above. Prior to applying the thermal spray coating 26, the pin bore surface 18 may be roughened, e.g., to allow for enhanced adhesion of the thermal spray coating 26.

Proceeding to block 102, the pin bore surface 18 may be sprayed with the thermal spray coating 26. In one exemplary approach, the thermal spray coating 26 may be applied by rotating the connecting rod 10 around a coating applicator, e.g., to coat an entire circumference of the piston pin bore surface 18. However, the thermal spray coating 26 may also be applied to an entire circumference of the piston pin bore surface 18 by rotating the coating applicator with respect to the connecting rod 10.

As discussed above, the thermal spray coating 26 may be applied to an entire inner circumference of the pin bore surface 18, or it may be applied to specific areas of the pin bore surface 18. In one exemplary approach to coating only a portion of the pin bore surface 18, e.g., to the first portion 21 or highly loaded area, a coating applicator may be moved with respect to a stationary connecting rod 10. In another exemplary illustration, a stationary coating applicator is employed and the connecting rod 10 may be moved relative to the stationary coating applicator to apply the thermally sprayed coating 26 to the pin bore surface 18. In another example, relative movement between the coating applicator and the connecting rod 10, e.g., by moving the coating applicator, the connecting rod 10, or both, may generally effect a radial indexing of the coating applicator with respect to the piston pin bore surface 18 of the connecting rod 10. For example, a thermal spray coating may be moved gradually along the piston pin bore surface 18 such that a thermal spray coating 26 is applied to a first portion 21 of the piston pin bore surface 18. Additionally, relative movement between the coating applicator and the connecting rod 10 may also include a movement of the coating spray in an axial direction with respect to the piston pin bore 16 and piston pin bore surface 18.

When applying the thermal coating 26 to a specific area, e.g., a high load area or first portion 21 defining an angular extent α, for example, a portion of the pin bore 18 may need to be machined in order to form a channel, e.g., including recessed surface 30 and recess transitions 28 disposed at either end thereof. In examples where the thermally sprayed coating 26 is applied only to a portion of the pin bore surface 18, a high load area may be determined at least in part from factors of the combustion loads, geometry of the piston pin bore 16, or any other relevant property of the connecting rod 10, e.g., a property of a material used to form the connecting rod 10.

The channel formed by the recessed surface 30 and recess transitions 28 may generally be configured to maintain the thermal spray coating 26 in the desired location. Moreover, as noted above, the channel may generally allow application of the thermal coating in a predetermined thickness along the desired portion, i.e., first portion 21, of the pin bore surface 18. The thermally sprayed coating 26 may also be applied to define at least a slight excess thickness at least in adjacent the edges 32 of the thermally sprayed coating 26'.

Proceeding to block 104, after the thermal spray coating 26 has been applied, the pin bore 16 in the small end 12 of the connecting rod 10 may be machined using any suitable means to form a finished bearing surface. Moreover, as noted above this machining of the thermally sprayed coating 26 may result in machining the edges 32' of the thermal spray coating 26' where excess thermally sprayed coating 26' has been applied. Accordingly, an excess amount of the coating material 26' may be removed such that an adjacent uncoated second portion 19 of the pin bore surface 18 is machined generally simultaneously with the machining of the thermally sprayed coating material 26'. Accordingly, the first portion 21 of the pin bore surface 18 may be substantially flush with the corresponding edges 32 of the second portion 19 of the pin bore surface 18. The process 500 may then terminate.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:
1. A connecting rod comprising:
   a small end having a piston pin bore disposed therein, the piston pin bore defined by a piston pin bore surface having a first portion and a second portion forming an entire circumference of the piston pin bore;
   a large end having a crankshaft pin bore disposed therein, the crankshaft pin bore defined by a crankshaft surface, the crankshaft pin bore being larger than the piston pin bore; and
   a coating applied to the first portion of the pin bore surface such that the second portion of the pin bore surface is uncoated;
   wherein the coating and the first portion of the pin bore surface are positioned along a lower portion of the piston pin bore surface such that the coating intersects a beam axis of the connecting rod, the beam axis extending between the piston pin bore and the crankshaft pin bore;

wherein the first portion of the pin bore surface is recessed with respect to the second portion of the pin bore surface by a recess distance;

wherein opposing ends of the first portion of the pin bore surface each terminate at a recess transition, the recess transitions each leading from the first portion of the pin bore surface to the second portion of the pin bore surface, the recess transitions each extending substantially parallel to the beam axis; and wherein the recess transitions extend substantially parallel to each other.

2. The connecting rod of claim 1, wherein the coating defines a coating thickness, the coating thickness substantially equal to the recess distance of the second portion of the pin bore surface.

3. The connecting rod of claim 1, wherein edges of the coating at opposing ends of the first portion of the pin bore surface are substantially flush with corresponding edges of the second portion of the pin bore surface.

4. The connecting rod of claim 1, the recess transitions each defining an oblique angle with respect to the adjacent first and second pin bore surfaces.

5. The connecting rod of claim 4, wherein the oblique angle is approximately 45 degrees.

6. The connecting rod of claim 1, wherein the first portion of the piston pin bore defines a first radius with respect to a bore center of the piston pin bore, and the second portion of the piston pin bore defines a second radius with respect to the bore center of the piston pin bore, wherein the first radius is larger than the second radius.

7. The connecting rod of claim 1, wherein the coating comprises at least one of a copper alloy, an iron alloy, a nickel alloy, a cobalt alloy, a molybdenum alloy, a tungsten alloy, a tin alloy, and an aluminum alloy.

8. The connecting rod of claim 1, wherein the first portion of the pin bore surface corresponds to a high load area of the pin bore surface configured to receive a relatively higher piston pin load than the second portion of the pin bore surface.

9. The connecting rod of claim 1, wherein the coating defines a coating thickness in a range of about 5 to 100 microns ($\mu m$).

10. The connecting rod of claim 1, wherein the recess transitions each extend parallel to the beam axis.

11. The connecting rod of claim 1, wherein the edges of the coating at opposing ends of the first portion of the pin bore surface are machined such that they are substantially flush with corresponding edges of the second portion of the pin bore surface.

12. The connecting rod of claim 1, wherein the coating is a thermal spray coating.

13. The connecting rod of claim 1, wherein the recess transitions extend parallel to each other.

14. The connecting rod of claim 1, wherein the coating extends along an angular portion of the piston pin bore surface defined by an angle taken from a center of the piston pin bore, wherein the angle is between approximately 45 degrees and approximately 135 degrees.

15. A connecting rod comprising:

a small end having a piston pin bore disposed therein, the piston pin bore defined by a piston pin bore surface having a first portion and a second portion forming an entire circumference of the piston pin bore, wherein the first portion of the pin bore surface is recessed with respect to the second portion of the pin bore surface by a recess distance;

a large end having a crankshaft pin bore disposed therein, the crankshaft pin bore defined by a crankshaft surface, the crankshaft pin bore being larger than the piston pin bore; and a coating applied to the first portion of the pin bore surface such that the second portion of the pin bore surface is uncoated;

wherein the coating and the first portion of the pin bore surface are positioned along a lower portion of the piston pin bore surface such that the coating intersects a beam axis of the connecting rod, the beam axis extending between the piston pin bore and the crankshaft pin bore;

wherein the first portion of the pin bore surface is recessed with respect to the second portion of the pin bore surface by a recess distance;

wherein opposing ends of the first portion of the pin bore surface each terminate at a recess transition, the recess transitions each leading from the first portion of the pin bore surface to the second portion of the pin bore surface, the recess transitions each extending substantially parallel to the beam axis; and wherein the recess transitions extend substantially parallel to each other.

16. The connecting rod of claim 15, wherein the coating defines a coating thickness, the coating thickness substantially equal to the recess distance of the second portion of the pin bore surface.

17. The connecting rod of claim 16, wherein edges of the coating at opposing ends of the first portion of the pin bore surface are substantially flush with corresponding edges of the second portion of the pin bore surface.

18. The connecting rod of claim 15, wherein the coating comprises at least one of a copper alloy, an iron alloy, a nickel alloy, a cobalt alloy, a molybdenum alloy, a tungsten alloy, a tin alloy, and an aluminum alloy.

19. The connecting rod of claim 15, wherein the first portion of the pin bore surface corresponds to a high load area of the pin bore surface.

* * * * *